Feb. 23, 1926.
J. F. JOHNSTON
1,574,658
HARD RUBBER ARTICLE AND METHOD OF MAKING SAME
Original Filed March 3, 1923
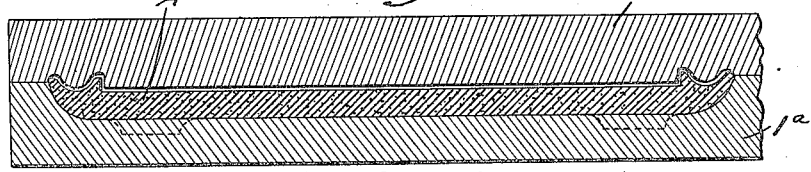
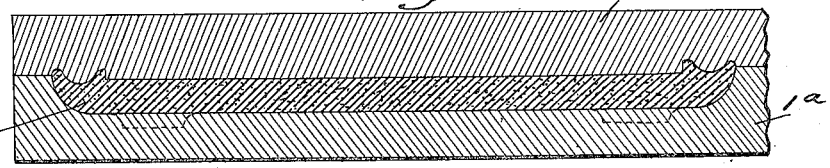
Inventor
John F. Johnston
By Spear Middleton Donaldson & Hall
Attorney Patented Feb. 23, 1926.

1,574,658

UNITED STATES PATENT OFFICE.

JOHN F. JOHNSTON, OF AKRON, OHIO, ASSIGNOR TO THE MILLER RUBBER COMPANY, OF AKRON, OHIO, A CORPORATION OF OHIO.

HARD-RUBBER ARTICLE AND METHOD OF MAKING SAME.

Original application filed March 3, 1923, Serial No. 622,581. Divided and this application filed June 6, 1925. Serial No. 35,314.

*To all whom it may concern:*

Be it known that I, JOHN F. JOHNSTON, a citizen of the United States, and resident of Akron, in the county of Summit and State of Ohio, have invented certain new and useful Improvements in Hard-Rubber Articles and Methods of Making Same, of which the following is a specification.

My present invention relates to improvements in the art of manufacturing hard rubber articles, and the article produced thereby, and is a division of my prior application #622,581, filed March 3, 1923.

Heretofore hard rubber articles have customarily been manufactured either by the pressure molding process or by the blowing process. In the pressure process a volume of hard vulcanizing rubber compound is forced to conform to a mold, constructed in usually two or more parts, forming a cavity the shape of the article desired, and subjected to a curing temperature for a sufficient time to vulcanize the compound. As the rubber does not swell or expand appreciably, great care must be exercised to insure that the mold is completely filled. If the article is of complicated form molding by this process may become impractical. Where articles are of considerable size, the pressure required to close the molds is enormous and powerful presses must be provided for such use as it is necessary to completely fill the mold cavity before the vulcanization begins. It is usual to provide a greater mass of rubber compound than is required to fill the cavity and a consequent overflow occurs from the excess material being squeezed out at the mold parting.

In the manufacture of blown hard rubber articles the same process is followed as in the manufacture of hollow soft rubber articles. The rubber itself is kept scrupulously free from any blowing material, the article is built up of pieces of such material so as to contain a closed cavity in the center, water or other blower is placed therein and the article placed in a closed mold. The heat of vulcanization causes the blower to expand the material to contact with the mold walls and thereafter vulcanization takes place. The resulting articles are hollow but in no wise cellular and uniformity in wall thickness is beyond control of the manufacture as the rubber is stretched unequally in the process.

I have discovered that by taking an ordinary hard rubber compound and incorporating a blowing agent therein by thorough mixing so as to distribute the blowing agent throughout the mass and building or forming an article therefrom slightly smaller than a mold cavity and subjecting to a vulcanizing temperature, the article will be caused to swell during or prior to vulcanization so as to completely fill the mold cavity without the formation of cells of appreciable size in the article so that the resulting article is apparently as solid as the ordinary hard rubber article. Moreover, I find that by varying the amount of blowing agent, I may increase the pressure on the article to any desired degree, without the use of mechanical devices, and without changing the physical structure of the article, for the purpose of sharp molding. The fact that expansion of the article is limited by the proximity of the rigid mold walls prevents the formation of cells of appreciable size in the article no matter what pressure is developed.

In order that my invention may be more readily understood, I have appended hereto a sheet of drawings, in which:—

Figure 1 is a sectional view of a closed mold with the rubber compound therein prior to vulcanization.

Fig. 2 is a similar view of the mold after vulcanization.

In proceeding according to my invention, I mix with a hard rubber vulcanizing compound a small quantity of the blower, which is thoroughly and evenly distributed throughout the rubber compound by the action of the mill. Thereafter a proper quantity of the compound is shaped to approximately the shape of the article desired, but of slightly smaller size so as to permit the mold to be readily closed with the article in the mold cavity, as shown at A in Fig. 1. The preliminary shaping of the rubber compound may be accomplished in any suitable manner, as for instance, by hand, or by cold pressing by the use of suitable dies or shaping devices. Thereafter the mold sections are secured together and placed in a suitable vulcanizer such as a steam heater, or the molds may be of a character designed for a press cure, in which the press elements would hold the mold parts together.

Where the article is of a shape requiring a cavity forming core, this may be made of any number of sections desired and capable of being removed piece by piece after vulcanization.

After the mold has been closed and subjected to vulcanizing heat while maintained in tightly closed condition, the heat gasifies the blowing agent which causes the article to swell until it completely fills the mold cavity and conforms in shape exactly thereto, as shown at A' in Fig. 2, in which shape it is vulcanized by the continued action of the heat.

After vulcanization is complete, the mold is cooled, preferably rapidly, as by the chilling action of cold water, and the completed article removed, and such article will be found to be to all intents and purposes the same as hard rubber, as due to the fact that expansion is limited by the mold walls, no cells or cavities of appreciable size are present, the product being substantially the same in appearance and strength as hard rubber articles molded in the customary manner. The precise amount of blowing agent is not material, as of course, as soon as the mold cavity is filled further expansion of the contents is prevented and hence no formation of cells of appreciable size can take place, but it is desirable to use such a quantity as will insure filling of the mold cavity without exerting undue internal pressure.

In the present description, when I say that the cells formed are not of appreciable size, I do not mean that such cells are always invisible to the naked eye, but I do mean that the cells are so small as to easily escape observation. I have found that if a section is cut from an article made by the present method, by sawing through such article the fine sawdust produced will completely obscure the cell structure. However, if the article is broken a minute cell structure is revealed. The size of the cells may vary somewhat in various articles depending upon the degree to which it is possible to fill the mold, as where the article is non-uniform in thickness, there may be greater expansion at some portions than at others. It is, therefore, possible to produce some articles with cells of microscopic size while in other articles some of the cells will be seen by the naked eye, but will be extremely small.

In Figs. 1 and 2 the mold is shown as a plain two-part mold, which may be of the ordinary or any desired construction having cooperating sections 1 and 1ª provided with mating cavities for molding the solid article.

Having thus described my invention, what I claim is:—

1. The process of producing a substantially solid rubber article, which consists in incorporating a blowing agent in the raw rubber compound, forming the unvulcanized article therefrom slightly smaller than the finished article, assembling a mold around the unvulcanized article, and applying heat to the mold whereby the article is expanded to the size and shape of the mold and vulcanized therein.

2. The hereindescribed method of producing a substantially solid hard rubber article, which consists in incorporating in an unvulcanized rubber compound, a relatively small quantity of a blowing agent, confining in a mold cavity a quantity of such compound which is slightly less than the capacity of the mold, and subjecting the mold to curing heat.

3. The hereindescribed method of producing a substantially solid hard rubber article, which consists in incorporating in an unvulcanized rubber compound, a relatively small quantity of a blowing agent, confining in a mold cavity a quantity of such compound which is slightly less than the capacity of the mold, and subjecting the mold to a curing heat, and chilling the mold before removal of the article.

4. An article of substantially hard vulcanized rubber, having a smooth exterior surface and an interior containing a plurality of evenly distributed cells of microscopic size.

In testimony whereof, I affix my signature.

JOHN F. JOHNSTON.